United States Patent

[11] 3,588,329

[72] Inventor John Monk
Harrow, England
[21] Appl. No. 571,599
[22] Filed Aug. 10, 1966
[45] Patented June 28, 1971
[73] Assignee Xerox Corporation
Rochester, N.Y.
[32] Priority June 15, 1966
[33] Great Britain
[31] 26,805/66

[54] SELECTIVE BINARY ENCODING OF VIDEO INFORMATION SIGNALS

8 Claims, 7 Drawing Figs.

[52] U.S. Cl. 178/6, 325/38, 340/347
[51] Int. Cl. H04n 7/12
[50] Field of Search 178/6 (DWR); 179/15 (APC); 325/38, 38.1; 340/347 (D–D)

[56] References Cited

UNITED STATES PATENTS

| | | | |
|---|---|---|---|
| 2,922,840 | 1/1960 | Lally | 178/6BWP |
| 2,978,535 | 4/1961 | Brown | 178/6BWR |

*Primary Examiner*—Robert L. Griffin
*Assistant Examiner*—Joseph A. Orsino, Jr.
*Attorneys*—James J. Ralabate, Norman E. Schrader and Ronald Zibelli

ABSTRACT: A selective encoding technique wherein each line of binary data is divided and subdivided in response to the detection of black or printed information according to the information content on a document, for example. The segments of binary digits in the waveform are inspected in sequence and for each segment that contains all background or white information, a single binary digit of one polarity is used to represent it. For the segments containing data or black information, a binary digit of the other polarity is used to describe this condition and the segment is further subdivided in the same manner for further encoding and data detection.

INVENTOR.
JOHN MONK

BY Anthony D. Cennamo

ATTORNEY

INVENTOR.
JOHN MONK
BY [signature]
ATTORNEY

INVENTOR.
JOHN MONK

BY [signature]

ATTORNEY

INVENTOR.
JOHN MONK
BY Anthony D. Cennamo
ATTORNEY

SELECTIVE BINARY ENCODING OF VIDEO INFORMATION SIGNALS

This invention relates to graphic communication systems and, more particularly, to methods and apparatus for reducing the bandwidth required for the transmission of video information signals.

As is known in a normal facsimile system, a document to be transmitted is scanned at a transmitting station to convert information on the document into a series of electrical signals. These video signals or carrier modulated signals corresponding thereto are then coupled to the input of a communication link interconnecting the transmitter with a receiver. At the receiving station, the video signals, in conjunction with suitable synchronizing signals, selectively control the actuation of appropriate marking means to generate a facsimile of the document transmitted.

A principal application of facsimile equipment is the transmission of printed or typewritten documents and letters. It is a distinguishing characteristic of such original documents that printing or typing is arranged in substantially horizontal lines. Examination of a typical letter, for example, will show that lines of typing actually occupy considerably less than half the vertical dimension of the letter, the rest of its dimension being blank and corresponding to spaces between lines as well as blank spaces at the top and bottom of the letter. In a conventional facsimile system, all parts of such a letter are normally scanned at a uniform rate. Assuming transmission over an ordinary telephone line, it may take in the order of 6 to 15 minutes to transmit an ordinary letter with reasonable resolution. Considering the cost of the telephone service, such a long transmission time becomes a serious limitation on the economic usefulness of facsimile equipment.

The signal redundancy inherent in facsimile signals due, for example, to the margins and spacing between paragraphs of a letter and the attendant increased transmission cost, have led to the development of various coding techniques to reduce such redundancy, thereby eliminating the wasted transmission time. One such coding technique is known as run length encoding in which binary numbers corresponding to various blocks of video data are sent rather than the usual facsimile signals. In such a system, a binary number of relatively few bits may be sent in lieu of a larger block of video data.

Such encoding techniques, while significantly reducing the number of bits which must be sent and thereby reducing the transmission time, have not been entirely satisfactory. In a normal facsimile system, the scanning of a document may be at, for example, 135 lines per inch. Since the information is, in general, not uniformly spread over the document surface, the rate at which the scanner presents information to the transmission channel varies with time and sometimes a complete scan line may consist of a single information bit, black or white. For this reason, conventional facsimile systems with prior art encoding techniques do not fully utilize the capacities of the transmission channels, and than an increase in speed of transmission of such information is possible.

It is, accordingly, an object of the present invention to provide methods and apparatus for efficiently utilizing the bandwidth capabilities of graphic communication and transmission systems.

It is another object of the present invention to optimize the information handling capability of transmission networks in graphic communication systems.

It is another object of the present invention to reduce the operating costs of transmitting binary data streams that include long periods of redundant information.

It is still another object of the present invention to decrease the bandwidth requirement for binary information transmission.

In accomplishing the above and other desired aspects, applicant has invented novel methods and apparatus for reducing the redundant information in a digital facsimile transmission system. There is disclosed a novel selective encoding technique wherein each line of binary data is divided and subdivided in response to the detection of black or printed information according to the informational content on a document. In accordance with a preferred embodiment of the invention, the serial video data waveform from the scanner is sequentially analyzed at the encoder for the existence of black or printed information. In a second embodiment of the invention, the scanning beam is interrupted at the end of a segment upon the encountering of black video information therein. The deflection circuitry at the scanner is controlled to reposition the scan so as to rescan the segment of the line containing the black or printed information.

With either embodiment, if a segment with a predetermined number of binary digits in the binary video waveform is found to consist of all white or background information, a single binary digit is placed in the encoded output waveform representing the white or background information in that particular segment. If the segment is found to contain some black or printed information, the segment is subdivided into predetermined subsegments with single binary digits of predetermined polarity placed in the output video waveform representative of the information in the subsegment. That is, segments of bits are inspected in sequence and for each segment that contains all background or white information, a single binary digit of one polarity is used to represent it. For the segments containing data or black information, a binary digit of the other polarity is used to describe this condition and the group is further subdivided in the same manner as before. The subdividing operation may be continued until the smallest group contains a single bit; or it may be terminated at any stage, depending on the informational distribution on the document. At the point where subdivisions are no longer profitable, that is, where the compression is no longer increased, the data contained in the smallest group may either be left unencoded or encoded by using another predetermined code.

In accordance with a further aspect of the present invention, the encoder, utilizing the principles of the present invention in the preferred embodiment, would be preceded by a delta encoder to further reduce the presence of black or printed information to be encoded. A delta encoder, as described in U.S. Pat. No. 2,916,553 to Crowley, issued Dec. 8, 1959, utilizing the situation that successive scanned lines contain similar information detects and subtracts the information data in successive scan lines from the next preceding scan line and only the difference between the two lines is transmitted. By placing a delta encoder as a stage preceding the binary encoder, the output information waveform from the delta encoder would be further devoid of black information, thus increasing the white information to be detected and encoded by the binary encoder. As the present invention effectively includes the encoding of white information, but the transmission of black information data as raw video information, the addition of a delta encoder would further increase the efficiency of the subject encoder in its operation of encoding the redundant information in a video signal waveform.

For a more complete understanding of the invention, as well as other objects and further features thereof, reference may be had to the following detailed description in conjunction with the drawings wherein.

Figure 1:
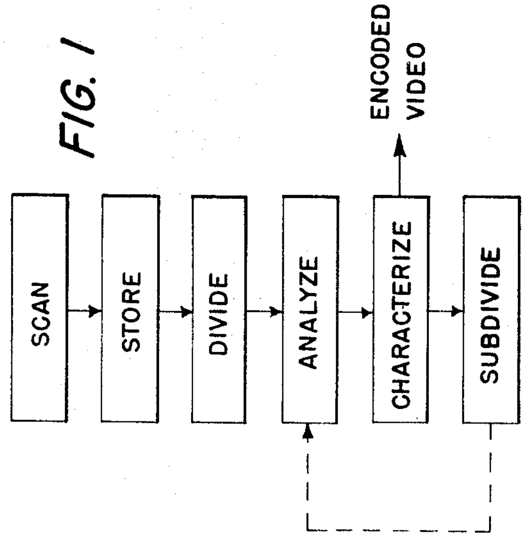
FIG. 1 is a flow diagram illustrating the operation of a facsimile transmitter according to a first aspect of the principles of the present invention.

Referring now to FIG. 1, there is shown a flow diagram of a first embodiment of the present invention. Video information from a facsimile scanner, in a manner hereinafter more fully described, is serially stored for electronic division of the video information waveform into elements of a predetermined number of binary digits. Each element is then sequentially analyzed for the existence of black or printed information data. If an element is found to consist of all white or background information, it is characterized by a binary tag which is transmitted in lieu of the entire element. If the element is found to have some black or data information, it may similarly be tagged and the entire element transmitted; or it may be subdivided into predetermined subelements, and further characterized by different binary tags which are also transmitted instead of the entire subelement. The subdividing operation may be continued until the smallest group contains a single binary digit, in the search for black data information, or terminated at any intermediate stage in accordance with the informational content of the documents to be transmitted. The data contained in the smallest group is then left unencoded, as subdividing may no longer be economically feasible.

Figure 3A:
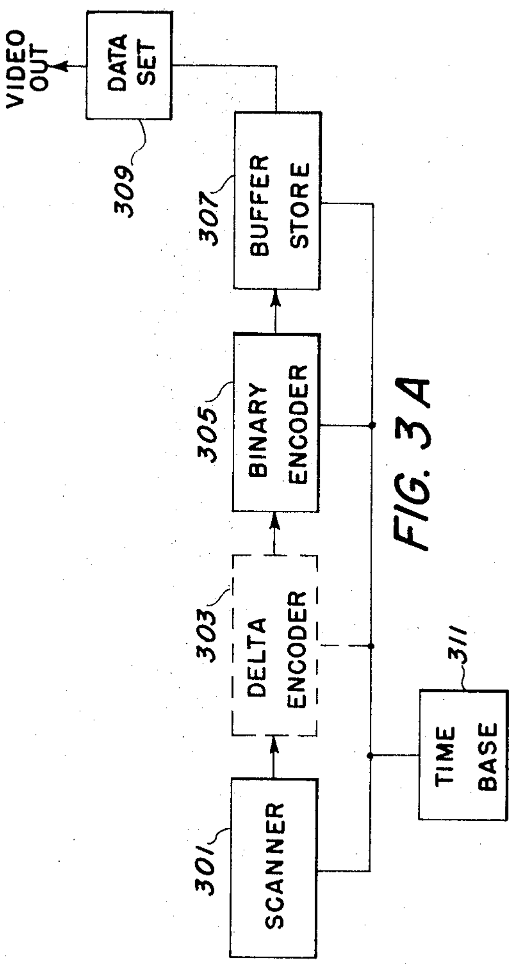
FIGS. 3A and 3B are block diagrams of a facsimile transmission system employing the principles of the present invention.
Figures 2, 3B:
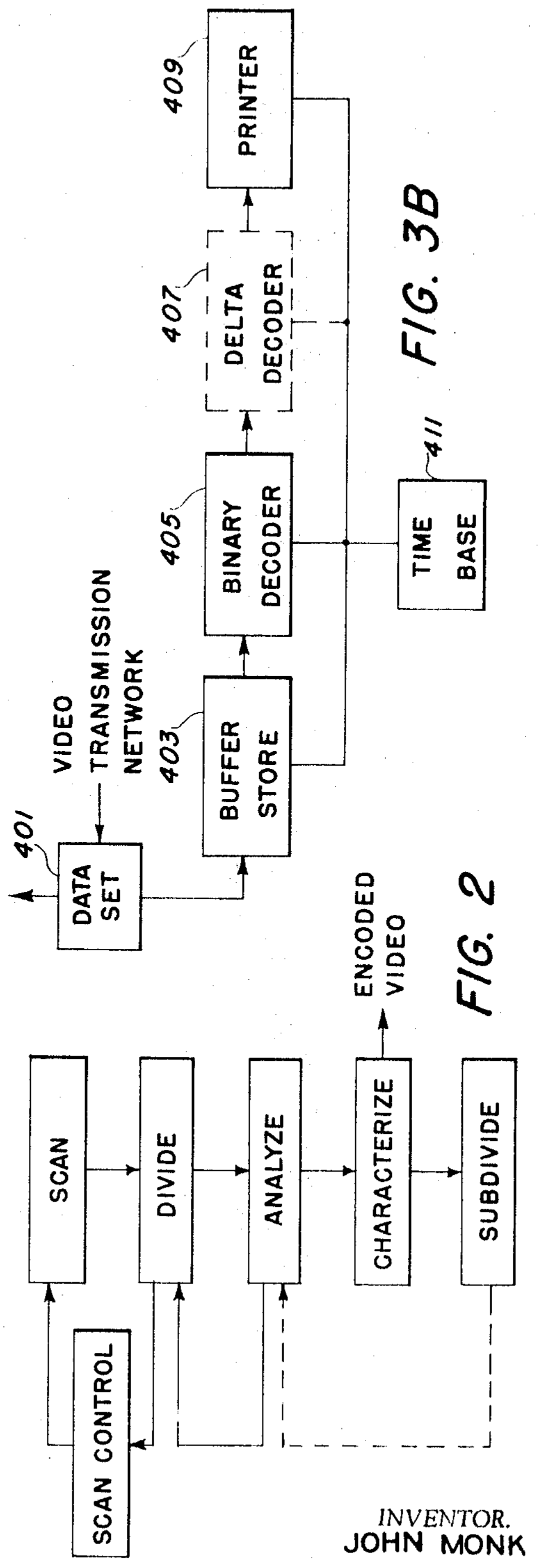
FIG. 2 is a flow diagram illustrating the operation of a facsimile transmitter according to a second aspect of the principles of the present invention.

In FIG. 2 is shown a flow diagram of the encoding operation in a second embodiment of the present invention. In this embodiment, the scanning beam is controlled according to the information capacity of a scan line on a document. As the scan moves across the document, the output video information waveform is being investigated for the presence of black data information. When a segment is noted to contain some black information data, the segment is characterized as such and the scan beam is interrupted and caused to retrace that segment. The contents of the segment may be transmitted in entirety or the subdividing and analyzing process may be repeated again for the presence and detection of black data information in the subsegments. Characterization is again utilized for indicating the status of the subsegments and their associated information content. The scan beam is controlled in the subdividing process until the operation approaches a predetermined subdivision. Scanning resumes for subsequent elements and the encoding operation of subdividing and analyzing may be repeated for each element found to contain black data information. Any of the known controlled scan circuits and apparatus may be used together with an encoder and decoder whose operation is similar to those shown and described in FIGS. 5 and 6.

Referring now to FIG. 3A, there is shown a facsimile transmitter in the first or preferred embodiment utilizing the principles of the present invention. The transmitter portion of the system includes a scanner 101, which in conjunction with a clock time base 111, derives individual pulses corresponding to black and white picture elements or dots forming the pictorial material explored by the scanner. The scanner 101 may be any of the mechanical or electronic devices well known in the art for translating the densities of elemental areas of typed or pictorial copy into signal waveforms. Electronic scanning, however, is generally preferred. The scanner may conveniently include a light source, such as a cathode ray tube, an optical system which delineates elemental areas of the subject copy, means for systematically moving one with respect to the other in two directions, and a light sensitive detection device together with directly associated circuits. The horizontal and vertical deflection circuitry for the scanner is controlled by the time base 111. The time base 111, in addition to supplying pulses to the scanner deflection circuits for positioning the beam accurately, supplies the timing pulses to the rest of the transmitter, in order that the system be in synchronization and for supplying the clock pulses for operation of the separate logic circuits. Included in the scanner 101 are the normal facsimile circuits, such as synchronizing and time-quantizing circuits, which convert the analog information signals to a digital output signal.

In accordance with a further aspect of the invention, the output from the scanner 301 is coupled to the input of a delta encoder 303. The delta encoder, as was hereinbefore set forth, utilizes the condition that successive scanned lines contain similar information, detects the logical difference between the information data in successive scan lines from the next preceding scan line and only transmits the difference signals derived from the two lines. The delta encoding technique, therefore, increases the length of the white or binary zero runs, allowing the data encoder 305 to monitor a video pulse train with increased lengths of binary zero or white information. The binary data encoder will hereinafter be more fully described in more detail in conjunction with FIG. 5. The use of the delta encoder 303 tends to increase the bandwidth compression efficiency of the overall system. However, the binary encoder 305, in accordance with the principles of the present invention, will operate effectively without the delta encoder preceding it and, thus, if desired, the delta encoder could be left out of this embodiment and still retain a desirable compression factor. The delta encoder is therefore shown in dotted lines in FIG. 3A to show the selective insertion into the circuit as desired.

Figure 5:
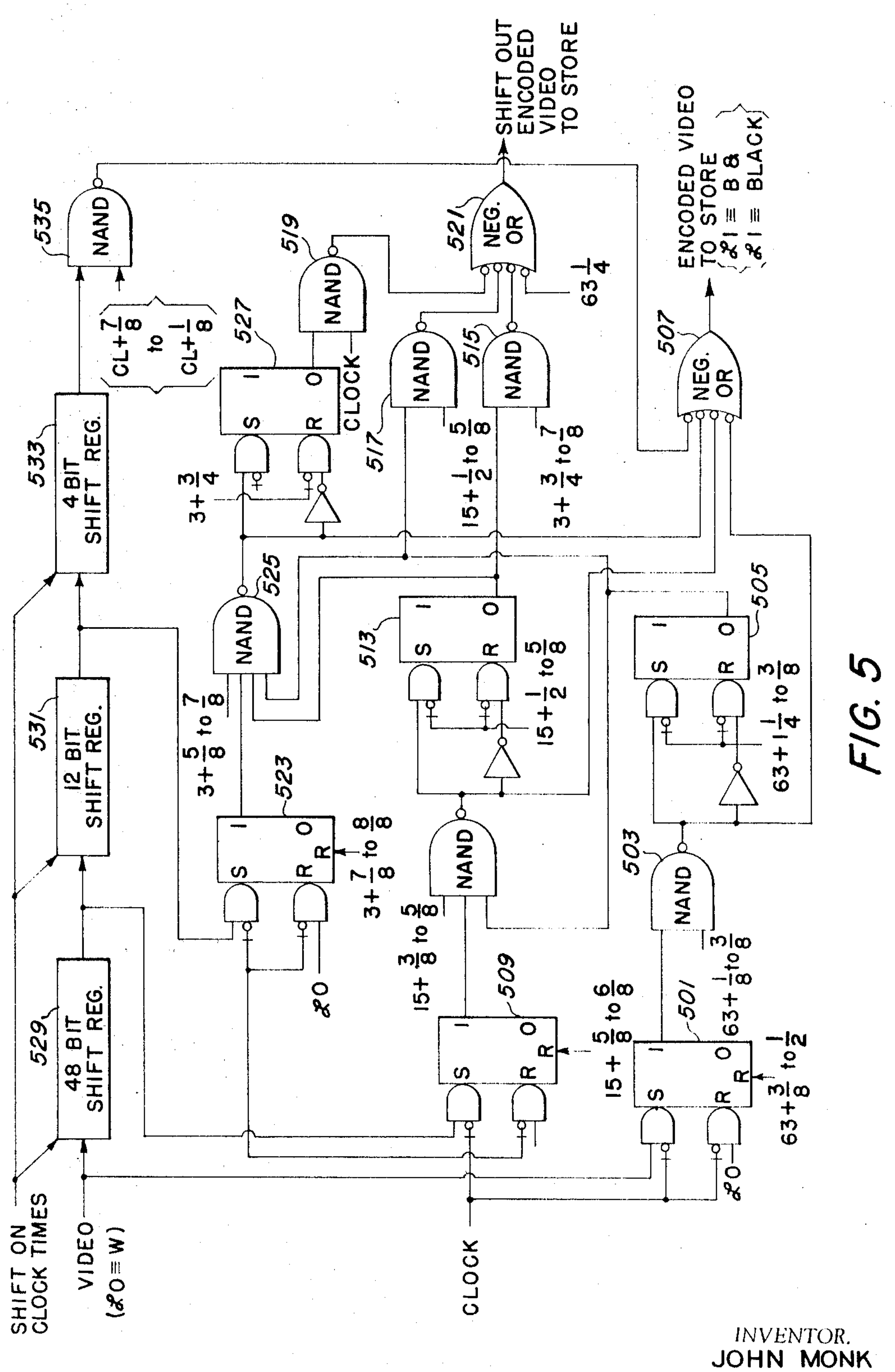
FIG. 5 is a detailed illustration of the selective binary encoder in accordance with the principles of the present invention.

The output from the binary encoder 305 is coupled to the input to buffer store store 307. The encoded information waveform derived from the binary encoder 305, in a manner to be hereinafter more fully described in FIG. 5, is stored temporarily at the buffer store 307 before transmission to the receiver, shown in FIG. 3B. The buffer store 307 may comprise a logical flip-flop circuit arrangement or a magnetic core matrix. The encoded waveform is received from the binary encoder 305 by the buffer store 307 as the information is encoded. However, the information to be transmitted over the transmission medium is drawn from the buffer store at the rate which will approach the maximum rate compatible with the bandwidth capability of the medium itself. At the input and output ends of the transmission medium are circuits 309 and 401 for providing compatibility between the transmitter and receiver circuits and the transmission medium. These circuits, commonly called data sets, provide impedance matching and power amplification and/or modulating apparatus. Such data sets may comprise line drivers or a frequency shift keyer. A clock source of known frequency would also be provided for transmission synchronization.

Referring now to FIG. 3B, there is shown a facsimile receiver apparatus compatible with the transmitter as shown in FIG. 3A. The transmitted video information is received from the data set 309 in FIG. 3A at data set 401 in FIG. 3B. The data set 401 transfers the information from the transmission mode to that compatible with operation in the receiver. Buffer store 403, similar to buffer store 207 in FIG. 3A, receives the information from the data set and is drawn upon by the data decoder 405 as is necessary for the decoding operation. The binary decoder 405, in an operation more fully hereinafter described in FIG. 6, reconstructs the signal waveform with its associated redundancy. Coupled to the binary decoder 405 may be a delta encoder 407, if a compatible delta encoder had been included at the transmitter. The delta decoder 407 would further reconstruct the original video signal waveform by reintroducing the black information into the waveform in the proper positions.

Coupled to the delta decoder 407, if used, or the binary decoder 405, is the facsimile printer 409. The printer 409 may comprise a flying spot scanner including a cathode ray tube similar to the type that may be employed in the transmitter as set forth in FIG. 3A. The electron beam of the cathode ray tube in the printer is selectively gated on in response to the received video signals, thus generating an information modulated source of light rays for selectively illuminating elemental portions of the light responsive photoreceptor surface of a xerographic printer. For a complete understanding of a xerographic facsimile printer, reference may be had to U.S. Pat. No. 3,149,201, issued Sept. 15, 1964, to C. L. Huber et al. It is to be understood, however, that the xerographic facsimile printer is exemplary only and other types of facsimile printers known in the art may be employed in practicing the present invention.

Figure 4:
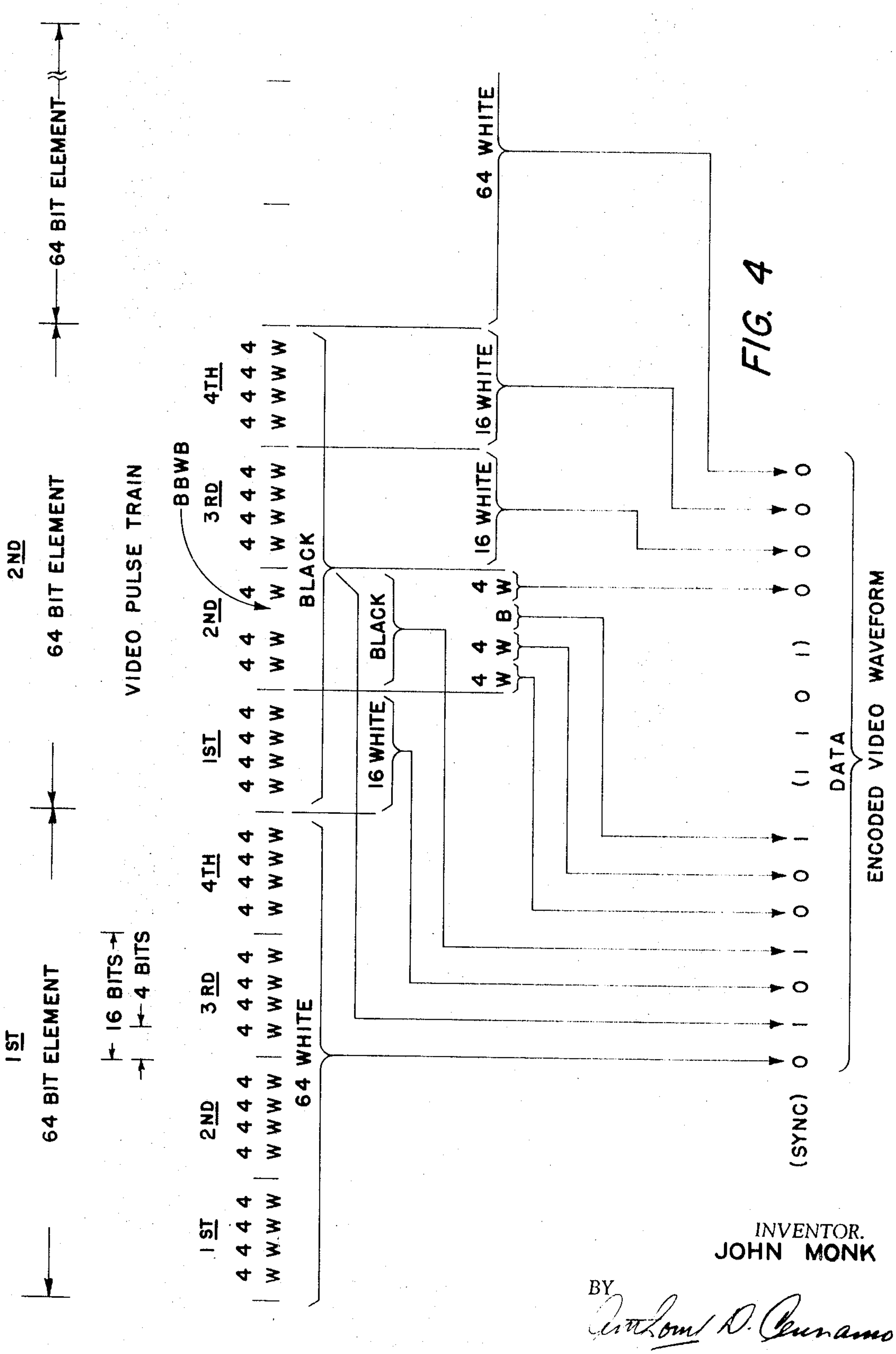
FIG. 4 is a representative diagram of part of a scan line on a document useful in understanding the various aspects of the present invention.

FIG. 4 is a representative diagram of a video pulse train from the output of a scanner and its associated encoded waveform obtained by utilizing the principles of the present invention. The disclosed encoding technique reduces the number of binary digits, i.e., bits, necessary to represent a message in digital data form. The technique is most effective if the data is likely to consist of groups of a predetermined number of consecutive bits of the same level and when groups of one are in the majority. For purposes of definition, binary zero digit groups would be the most probably occurring and it is to be considered as white or background information, while binary one digits would be considered as the existence of black or printed information.

The video data stream from the scanner is divided into A segments of N bits each by the encoder, as will hereinafter be more fully explained, N being smaller than the longest group of consecutive binary zero digits that is likely to occur. If this segment is detected to be all binary zero digits, a single binary zero is used to encode it. If the entire message consists of binary zero or white information, A binary zero digits equaling the number of A segments are used to encode it. If data or black information is detected in a segment, a single binary one digit is used to encode this condition, which indicates that this segment is to be subdivided into B subsegments of N/B bits each, N/B being an integer. These subsegments of N/B binary digits each are inspected in sequence and for each group that contains all binary zero digits, a single binary zero digit tag is used to represent it. For the groups containing printed or black information, a binary one digit tag is used to describe this condition, and the group if further subdivided in the same manner as above. The successive subdividing may be continued until the smallest group contains only a single binary digit or may be terminated at any stage in accordance with the information distribution of the various documents to be transmitted. At the point where the subdividing would no longer appreciably increase compression, the data or black information contained in the smallest group is transferred into the output data stream.

Using FIG. 4 as an example, a typical scanned line of 1344 bit positions has been divided into 21 segments of 64 bits each. Only part of the line has been illustrated to facilitate the explanation of the encoder operation. For this example, it is assumed that the smallest profitable group is four bits in length, thus the 64-bit segment has been subdivided into four subsegments of 16 bits each and further subdivided into the sixteen groups of four bits each. The first 64-bit segment is seen to have 64 binary zero digits indicating white or background information and, therefore, in the encoded output data waveform is placed a binary zero indicating the lack of any black or printed information in the first 64 bits in the segment. Inspection of the second 64-bit segment reveals black information in the third 4-bit group in the second 16-bit subsegment. Thus, a binary one digit is placed in the output data stream indicating that black information is present somewhere in the second 64-bit segment.

As black information has been detected in the video stream from the scanner, the encoder will now inspect the four 16-bit subsegments in sequence. As no black information is detected in the first 16-bit subsegment, a binary zero bit is placed in the output data stream. Upon investigation of the second 16-bit subsegment, black information is found in the third 4-bit group and thus a binary one digit is placed in the output video stream indicating that black information is found somewhere in this second subsegment. Upon detection of the black information, the encoder further subdivides the subsegment into the four groups of four binary bits each. As the first 4-bit group contains no black information, a binary zero digit is placed in the output data stream. Inspection of the second 4-bit group reveals no binary one or black information and thus another binary zero digit is placed in the output data stream. The next 4-bit group, however, does contain black information and thus a binary one digit is placed in the output data stream representing the existence of black information in the 4 -bit group. The next four bits in the output data stream are the actual video data as detected by the scanner. Thus, the binary sequence "1101" is placed into the output data stream representing the information detected as actual video information. Further inspection of the second 16-bit subsegment reveals no black or binary one information in the last 4-bit group and thus a binary zero digit is placed in the output data stream representative thereof.

Inasmuch as binary one or black information was detected in the second 64-bit segment, inspection must continue for the other two remaining 16-bit subsegments. As no black or binary one information is detected in these last two subsegments, two binary zero bits are placed in the output data stream. Thus, it can be seen that as black information is detected in a 64-bit segment, only then is the element subdivided into further groups for the detection of actual black or binary one information. The third 64-bit element, of which only a part is shown, was found to contain no black or binary one information and thus a binary zero bit is placed in the output data stream indicating no black information in 64 bits.

If, for example, an entire line was scanned and no black or binary one information was detected, the encoded word for the whole line would consist of 21 binary zero digits indicating the lack of such black or binary one information. Excluding the sync word, which may appear between data waveforms of the different lines so as to indicate to the receiver the beginning and end of an encoded line, the maximum bandwidth compression of a line utilizing the subdivisions as hereinbefore described would be 64:1. It is obvious, however, that other bit subdivisions could be utilized depending upon the distribution of black and white information on the document to be scanned and transmitted.

FIG. 5 is a logic diagram of the binary encoder 305 of the preferred embodiment, as shown in FIG. 3A, utilizing the principles of the present invention. The binary encoder 305 replaces white information with control bits while sending the black information unencoded. For purposes of illustration, segments of 64 bits, which would be subdivided into 16-bit subsegments and then four bit groups, are utilized; however, it is apparent that any numerical bit subdivision could be utilized by one skilled in the art.

Specifically, if all bits in a set of 64 are white, they are replaced by a white or binary zero control bit. If some black information is present in a set of 64, a black or binary one control bit is sent. It is followed by a control bit indicating whether the first 16 bits within that set of 64 bits has any black information. If not, a white or binary zero control bit is sent. This is followed by a control bit indicating black or white for the second set of 16 bits. If black information is indicated, control bits indicating black or white in sets of four are sent. A black indicator bit at this point is followed by the four actual video bits as detected at the scanner. This operation continues for all four 16 subsegments within the 64-bit segment.

The logic circuit in FIG. 5 accomplishes this encoding technique by examining the video data stream from the scanner as it passes by, and remembering if any black is present in blocks of 64, 16, and four. The necessary indicator bits are then added at the proper places and followed by actual video data, if black information is indicated. The incoming video information is shifted into the encoder by a clock pulse source from the external time base at the information scan bit rate. Flip-flop 501 monitors the video pulse train for black information in bit segments of 64, flip-flop 509 in subsegments of 16 bits, and flip-flop 523 in groups of four bits.

After the sixty-fourth clock pulse, flip-flops 501, 509, and 523 indicate whether any black information bits are present in the 64 bits stored in the shift registers 529, 531, and 533, the first 16 bits stored, and the first four bits stored, respectively. Dividing the time between clock pulses into eighths, between the one-eighth to three-eighth clock times, for example, the information in flip-flop 501 is transferred through NAND gate 503 into flip-flop 505, and also into storage as an indicator bit. Between the three-eighths to five-eighths clock times, the information in flip-flop 509 is transferred through NAND gate 511 into flip-flop 513. If the information in flip-flop 513 shows any black information to be present in the segment of 64 bits, the white or black information just shifted into flip-flop 513 will also be stored as an indicator bit, as will the new information supplied to flip-flop 513 at the sixteenth, thirty-second, and forty-eighth clock times later. However, if flip-flop 513 detects only white information to be present, none of the control bits from flip-flop 509 will be stored.

Likewise, between the five-eighths to seven-eighths clock times, information from flip-flop 523 is transferred through NAND gate 525 into flip-flop 527. It is also stored if both flip-flops 505 and 513 indicate some black in the present subsegment. If this indicator shows black, the next four clock pulses shift the actual video data into storage. At least one of these video data bits will be black at this point. If this indicator bit from flip-flop 523 was stored, its contents at clock times of four, eight, and 12 will also be stored, followed by four data bits if any black is indicated for that set of four bits. NAND gates 515, 517 and 519 and negative-OR gate 521 supply the shift pulses to shift the data into the buffer store from negative-OR gate 507.

Actual operation of the binary encoder in FIG. 5 will be described in conjunction with the video pulse train as shown in FIG. 4 to facilitate understanding. The output video information from the scanner is stepped into the 48-bit shift register 529 at each clock time by a separate clock pulse source from the time base. The input video information is also present at the "set" terminal of flip-flop 501. As binary "zero" has been defined as white or background information and binary "one" has been defined as black or printed information, it can be seen that flip-flops 501, 509, and 523 are kept in the "reset" condition at all times except when switched by the presence of an input binary one digit indicating black information. That is, logic zero is a reference level disabling signal normally provided by applying a DC line potential to the reset terminal of the flip-flops. Thus, as the input video information is stepped into the 48-bit shift register 529, the set terminal of flip-flop 501 sees the binary zeros in the information wave train. The condition, therefore, of the output terminal of flip-flop 501 remains at the binary zero level as an input binary one, indicating black information is required to switch the flip-flop to the output binary one condition. If, after all the 64 bits have been stepped into the shift registers, flip-flop 501 has not detected any black or binary one information, then the output from the flip-flop 501 will not have changed from the binary zero condition. Between the sixty-third and sixty-fourth time period, a timing pulse of duration of one-quarter of the clock period will open NAND gate 503 and by the reversal of polarities will have a binary one at its output. This signal, at the binary one level, will also appear at the input to negative-OR gate 507. By reversal of polarities there, the binary one condition is inverted to a binary zero which is fed to the output buffer store. As no binary one or black information was detected in the entire first 64-bit segment, none of the control bits from flip-flops 513 and 527 will appear at the output of negative-OR gate 521. Thus, the not-time pulse at the sixty-third and a quarter time period level of one-eighth clock period duration will appear as a binary one at the output of the negative-OR gate 521 to allow the indicator binary zero from negative-OR gate 507 to be shifted into the buffer store.

A safety factor is built into the group encoder such that if extraneous noise had caused a binary zero digit to become a binary one digit in the shift registers, which would falsely indicate the existence of black information, such information would still not be allowed to pass to the buffer store. As the input video pulse waveform had been coupled directly to the input of flip-flop 501 and subsequently no black or binary one information had been detected, the output from NAND gate 503 remains at the binary one level at the sixty-third clock time, as has been hereinbefore set forth. As flip-flop 505 had not seen a change of input pulses from binary zero zero to binary one, the output therefrom remains at the binary zero level. The output of flip-flop 505, therefore, being coupled as an input to NAND gates 511 and 525, effectively blocks these NAND gates from passing on the indicator bit necessary for the detection of a binary one indicating black information to the negative-OR gate 521, the output of which is the shift pulses used to shift the encoded video from gate 507.

While the information from the first 64-bit element is being shifted through shift register 529 and encoded, the next 64-bit element appears right after the first 64-bit element. Now, however, flip-flop 501 has been pulsed at its reset terminal so as to reset the flip-flop if it had been switched. As no black information had been detected in the first 64-bit element, flip-flop 501 would already be in the reset condition, however. As the 64 bits from the next element of information are shifted into the 48-bit shift register 529, the information bits from the previous 64-bit element are being shifted along in front of the information from the second 64-bit element.

In conjunction with FIG. 4, it can be seen that the first 16 bits of the second 64-bit element contain no black information but contain all binary zero or white information. At this point, therefore, flip-flop 501 still remains in the binary zero or reset condition until the information from the second 16-bit subelement is received at the set terminal of flip-flop 501. Eight white bits go by without black information; however, the ninth bit in the second 16-bit subelement is a black bit which sets flip-flop 401 to the binary one condition. This information, however, is only part way through the 48-bit shift register 529 which is still operating on the previous element's 64 bits.

When the first 16 bits of the second 64-bit element are shifted out of the 48-bit shift register 529, flip-flop 509 will indicate the presence of no black information. When the second 16-bit subelement of the second 64-bit element is shifted out of the 48-bit shift register 509 into the 12-bit shift register 531, flip-flop 509 will note the presence of the black information by the setting of the flip-flop from the binary zero state to the binary one state. When the first 16-bit subelement has been shifted out of the 48-bit shift register 529, all 64 bits of the second element have been shifted into the shift registers. At this time, a clock pulse at the input to NAND gate 503 effectively unblocks the gate and allows the binary one level from the output of flip-flop 501 to appear at the output of NAND gate 503 as a binary zero. With an inversion at the input to the reset terminal of flip-flop 505, together with the timing pulse at the sixty-third and a quarter clock time, flip-flop 505 is reset. In this condition, the binary zero at the output of NAND gate 503 is inverted at the negative-OR gate 507 and is stored at the buffer store by the not-timing pulse at the negative-OR gate 521.

The output from the flip-flop 505 is now at the binary one level which effectively unblocks NAND gate 511. When the second 16-bit subelement is stepped from the 48-bit shift register 529, flip-flop 509 notes the change from white to black information and is set to the binary one level. As NAND Agate 511 is now effectively unblocked at the fifteenth and three-eighths clock time, a binary zero appears at the output of NAND gate 511 which resets flip-flop 513 to the output binary condition. The binary one state of flip-flop 513 now appears as an input to NAND gate 515 and NAND gate 525. Along with the binary one condition of flip-flop 505 which appears at NAND gate 517 and NAND gate 525 effectively unblocking NAND gate 525. When flip-flops 509 and 513 noted the lack of binary black information in the first 16-bit subelement, NAND gate 517 passed a signal through negative-OR gate 521 to shift into the buffer store 307, in FIG. 3A, the binary zero condition indicating all white information from the output of NAND gate 511. As soon as flip-flop 513 notes the existence of black information from flip-flop 509, a reset pulse resets flip-flop 509 to allow for detection of black information in the next 16-bit subelement.

With the 16-bit subelement passing through the twelve bit shift register 531 with the black information, flip-flop 523 now is set into the binary one condition at the detection of the black information. As NAND gate 525 has been effectively unblocked at the clock pulse between the third and fourth clock time, the binary one input to NAND gate 525 is noted as a binary zero at the output of the NAND gate 525 and an input to flip-flop 527. With a reversal of polarity at the reset terminal of flip-flop 527, a binary one condition is noted at the input to NAND gate 519. The other input to NAND gate 519 is the clock pulse source pulsing at the clock time which, by reversal of polarity at negative-OR gate 521, allows the next four clock pulses to shift information into the buffer 307. Such information appears at the output of NAND gate 535 and by reversal of polarity at negative-OR gate 507, is shifted into the buffer store by the shift pulses generated at negative-OR gate 521. These video pulses are the actual video information detected at the scanner and shifted through the four bit shift register 533.

Flip-flop 523 has been reset at the clock pulse between the third and fourth clock period so as to investigate the next four bits in the last group of the second 16-bit subelement. There being no black information in the last group, flip-flop 523 is not set, thus remaining in the reset condition, effectively blocking NAND gate 525. With a binary one output from the NAND gate 525, by reason of its blocked condition, flip-flop 527 is put into the set condition effectively blocking NAND gate 519. The binary one condition appearing at the output of NAND gate 525 also appears at the input to negative-OR gate 507 and by reversal therein appears at the output as a binary zero. NAND gate 515, receiving a clock pulse between the third and fourth clock period, shifts into the buffer store 307 the binary zero indicating no black information in the last group of the second 16-bit subelement.

While this has been taking place, the third 16-bit subelement of the second 64-bit element has passed by flip-flop 509, which does not detect the existence of any black information. Therefore, the output of flip-flop 509 remains in the binary zero state effectively blocking NAND gate 511. A binary one condition remains as the output from NAND gate 511 and by reversal thereof in negative-OR gate 507 appears as a binary zero at the output of the gate. By a time pulse between the fifteenth and sixteenth clock period at NAND gate 517, such binary zero is effectively shifted into the buffer store 307 to indicate no black information in the third 16-bit subelement. Flip-flop 509 also sees the white condition of the fourth 16-bit subelement and by the same operation, the encoder effectively stores a binary zero also indicating the lack of black information in the fourth 16-bit subelement.

The previous paragraphs have described the operation of the binary encoder with the first two 64-bit elements in a signal waveform representative of a scan line from a scanner. The encoder would operate on the succeeding 64-bit elements in the same manner as hereinbefore described, until the entire line or message had been investigated and encoded. The operation would be similar depending upon the distribution of the black or binary one information. After the entire line has been investigated and encoded, a special sync word could be added into the encoded data stream so that the receiver would be able to detect the beginning and end of an encoded line. Such sync word could be added at the buffer store upon detection of the end or beginning of the line, according to the design specification. Such sync word generator may consist of a logical flip-flop circuit which, upon energization, would initiate a sync word of predetermined length. The encoding or the video information and addition of sync words would be continued until the entire length of the document had been scanned and encoded until the detection of an end of document signal, which would cease operation in the scanner and receiver.

Figure 6:
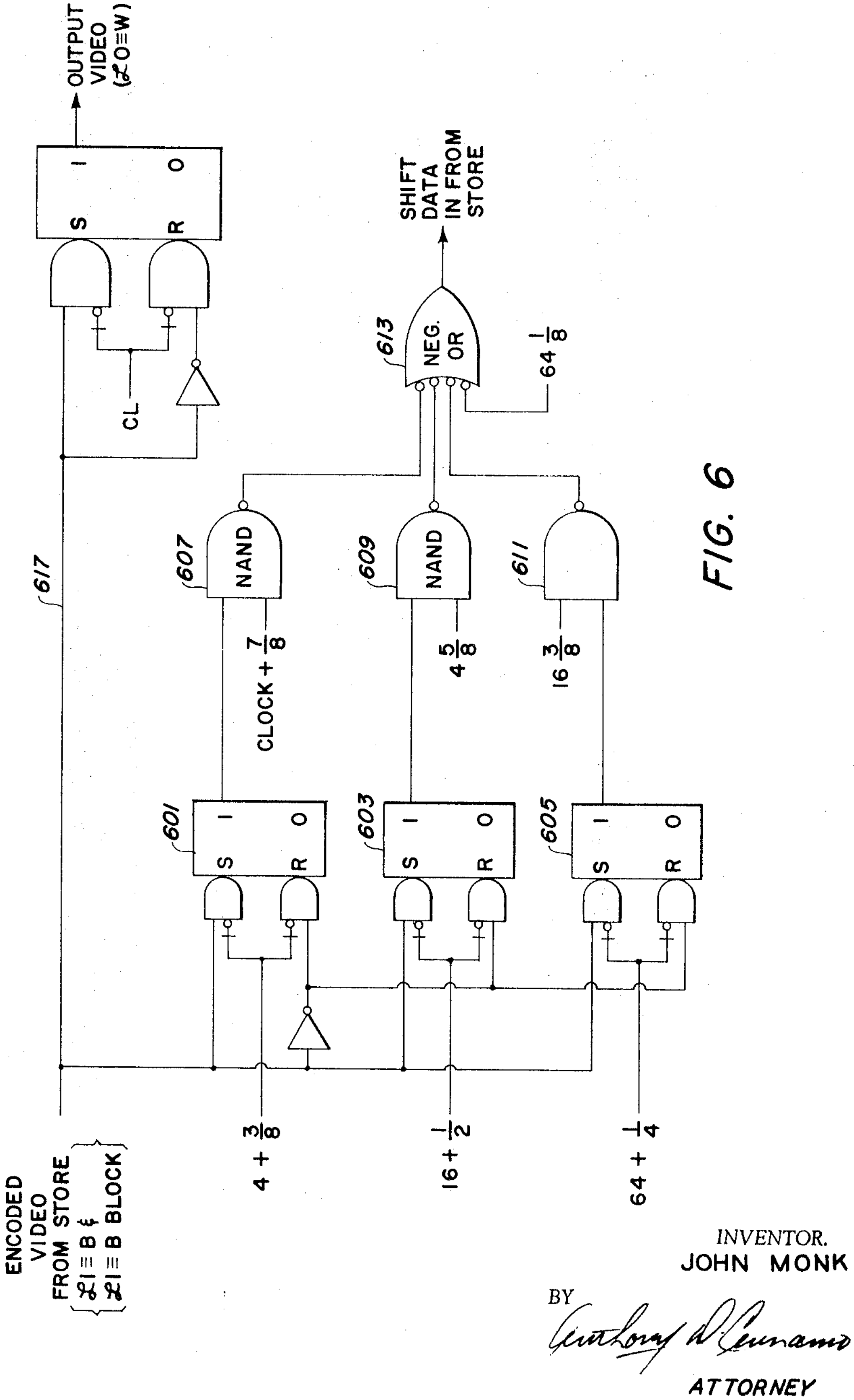
FIG. 6 is a detailed illustration of the binary decoder compatible with the binary encoder in FIG. 5 and in accordance with the principles of the present invention.

FIG. 6 is a logic diagram for a binary decoder 405 that is compatible with the encoder as shown and described in FIG. 5. This logic supplies the proper video bit on the output video line which may change only at each clock time. What appears on line 615 between clock times will not change the output signal since the output is effectively strobed by the separate clock pulses at flip-flop 615. That is, the state of the output line at a clock time determines the video until the next clock time, no matter what the line 615 does during the interval between clock pulses. NAND gates 607, 609, and 611 and negative-OR gate 613 provide the pulses to shift in additional data from the buffer store. Data is shifted out on each clock time. Operation is most easily explained by choosing a specific case of incoming data.

Utilizing the encoded video waveform 0101001(1101)0000 as seen in FIG. 4, the first bit encountered after the sync word in the line to decode is a binary zero digit. This means that the first 64 bits of video should be printed as white. This bit was shifted in from the buffer store 403 on the one-eighth clock period between the clock pulses. On the one-fourth clock time, flip-flop 605 is strobbed by the clock pulse occurring every sixty-fourth and a quarter clock periods. Thus, NAND gate 611 is blocked by means of the binary zero level on the output from flip-flop 605 from shifting the incoming data on the three-eighths clock time occurring every 16⅝ clock times. Therefore, on the sixteenth and a half clock time, flip-flop 603 is reset and NAND gate 609, by means of the binary zero level on the output of flip-flop 603, blocks the five-eighths clock pulse from shifting the incoming data from the buffer store 403. At the 4¾ clock time, flip-flop 601 is reset and by means of the binary zero condition on the output of flip-flop 601, NAND gate 607 blocks the shift pulses from shifting data into the decoder from the buffer store. The next data bit from the buffer store 403 will be shifted in only when the clock pulse at the sixty-four and one-eighth clock time appears. Thus, for 64 clock pulses at the clock bit time, only the first binary zero digit from the buffer store 403 is shifted into the decoder, which by means of the 64 clock pulses at flip-flop 615 is transferred to the printer as white information.

The next binary digit in the encoded video waveform in FIG. 4 is a binary one indicating that there is some black information in the second 64-bit segment of video. If the binary one is shifted out of the buffer store and into the decoder at the 64⅛ clock time, flip-flop 605 will be set at the 64¼ clock time and NAND gate 611 allows the three-eighths clock pulse at the sixteenth clock period to shift in the incoming data from the buffer store. Since this bit is a binary zero, the third bit in the video pulse train shown in FIG. 4, the first 16 video bits in this second set of 64 bits are indicated as white information. Therefore, on the one-half clock time at the sixteenth clock period, flip-flop 603 is reset and gate 609 is blocked. Also, on the three-fourths clock time at the fourth clock period, flip-flop 601 is reset and blocks NAND gate 609. Thus, as no shift pulses appear at the output of negative-OR gate 613, 16 bits of white video are shifted out at the clock times by the clock pulses.

On the sixteen and three-eighths clock time, the next, or fourth control bit in FIG. 4, is shifted into the binary decoder from the buffer store 403. Since it is a binary one, there is indicated that some black is present in the next 16-bit subelement. Therefore, on the one-half clock time at the sixteenth clock period, flip-flop 603 is now set by this incoming binary one, allowing the five-eighths clock pulse at the fourth clock period to shift in another data bit from the buffer store 403. As the next binary digit is a binary zero, there is indicated all white information in the first 4-bit positions in the second 16-bit subelement. As this binary zero digit does not set flip-flop 601 to the output binary one condition, the next four clock pulses will shift out four binary zeros. As NAND gate 609 has as an input the binary one digit indicating black information in the second 16-bit subelement at the 4⅝ clock time, the output of NAND gate 609 energizes negative-OR gate 613 to shift in the next control bit from the buffer store. As this digit is also a binary zero, there is indicated white information also in the second four bit group of the second 16-bit subelement.

At the next four and five-eighths clock time, the next digit is shifted in from the buffer store 403 and, as shown in FIG. 4, is a binary one indicating black information exists in the third 4-bit group of the second 16-bit subelement. At the four and three-fourths clock time, flip-flop 601 is now set by this incoming binary one, allowing the next four pulses at the seven-eighths clock times at the input to NAND gate 607 to shift in the actual data bits from the buffer store 403 to be printed as information at the printer.

At the 4⅝ clock time at NAND gate 609, negative-OR gate 613 shifts in the next data bit from the buffer store. Flip-flop 601 now sees a binary zero digit from the buffer store indicating all white information in the last four bit group of the second 16-bit subelement. At the 4¾ clock time, flip-flop 601 is reset. As flip-flop 601 is now not in the set condition, the next 4 clock pulses will shift out binary zeros indicating four bits of white information in the last 4-bit group. The operation continues with the next two binary inputs as binary zeros indicating white information in the last two 16-bit subelements of the second 64-bit element. This operation continues until the entire document is decoded and printed out at the printer.

In the foregoing, there has thus been disclosed methods and apparatus for reducing the redundant information content in a digital facsimile transmission system. While the embodiments have been described with a scan line subdivided into segments of 64, 16, and 4 bits each, as has been hereinbefore discussed, such a subdivision is exemplary only and could differ for different groups of documents with varying information densities. Other logic components may be utilized for similar subdivided segments without departing from the principles of the present invention. In addition, logic NAND and negative-OR gate circuitry, together with flip-flop circuits, have been disclosed and described; however, it is apparent that other logic circuitry could be designed by one skilled in the art to perform the same or equivalent functions. The clock pulses at the clock times described were in conjunction with the logic shown. Other clock derivations may be used with a logic circuit of equivalent function, such as an interlace clock, for example. Thus, while the present invention, as to its objects and advantages, as described herein, has been set forth in specific embodiments thereof, they are to be understood as illustrative only and not to be limiting. It is applicant's intention, therefore, to be limited only as indicated by the scope of the appended claims.

I claim:

1. In a graphic communication system wherein information representative of scan lines in a predetermined raster on a printed document is transmitted by binary electrical signals, the method of reduced redundancy encoding comprising the steps of:

dividing said binary electrical signals into a plurality of elements;

sequentially analyzing said elements for detecting the presence of a first binary level representative of the printed information on said document;

characterizing each element with a first or second binary digit according to the occurrence of said first binary level or a second binary level representative of the background information on said document, respectively; subdividing at least once any element containing a first binary digit indicative of the presence of said first binary level therein into a plurality of subelements;

further analyzing sequentially the subelements of an element for the presence of said first binary level;

further characterizing each subelement with a first or second binary digit according to the occurrence of said first or second binary level;

interrupting the scan upon detection of said first binary level in an element;

repositioning the scan within said element for the inspection of said subelements for said first binary level;

further interrupting and repositioning the scan at least once upon detection of said first binary level in a subelement; and transmitting at least one of said binary digits to define the informational content of each of said elements and subelements.

2. In a graphic communication system the method of transmitting video signals comprising the steps of:

scanning selective elemental areas of a plurality of lines on a document along a predetermined raster to form a binary data waveform representative of the information on said document;

dividing the data waveform into A segments of N binary digits each, wherein N is an integer smaller than the longest group of consecutive binary zero digits representative of background information that can occur;

transmitting a single binary zero digit upon detection of all binary zero digits in a first segment;

subdividing at least once a second segment into B subsegments of N/B binary digits upon detection of at least a single binary one digit within said second segment representative of printed information, N/B being an integer;

inspecting said subsegments in sequence for the detection of at least a single binary one digit;

transmitting a binary zero digit for each subelement detected with all binary zero digits; and further transmitting a binary one digit followed by the actual N/B digits within said subsegment upon detection of at least a single binary one digit.

3. In a graphic communication system, the method of reducing the redundancy in a binary video waveform comprising the steps of:

scanning selective elemental areas of a plurality of lines on a document along a predetermined raster to form a data waveform representative of the information on said document;

digitizing said data waveform to form a binary data waveform;

dividing the binary data waveform into segments of predetermined numbers of binary digits;

sequentially analyzing said segments for the presence of binary digits representative of the printed information on said document;

deriving a single binary digit of a first polarity upon detection of all binary digits in a segment representative of the background information on said document and of a second polarity upon detection of at least one binary digit in a segment representative of the printed information on said document;

subdividing at least once those segments detected with at least one binary digit representative of the printed information;

sequentially analyzing the subsegments for the presence of binary digits representative of the printed information on said document;

deriving a single binary digit of a first polarity upon detection of all binary digits in a subsegment representative of the background information on said document and of a second polarity upon detection of at least one binary digit in a subsegment representative of the printed information on said document; and transmitting the binary digits comprising said subsegment detected with at least one binary digit in a subsegment representative of the printed information immediately following said single binary digit of a second polarity.

4. In a graphic communication system, a binary encoder for reducing the redundancy in a binary signal waveform comprising:

storage means for storing at least one of a plurality of successive like portions of said binary signal waveform;

analyzing means coupled to said storage means for detecting the presence of a first binary level in said successive portions of said binary signal waveform;

means for generating one of two binary characterizing digits for each portion wherein a first binary characterizing digit is indicative of the presence of all binary digits of a second binary level within any of said like portions and wherein a second binary characterizing digit is indicative of the presence of at least one binary digit of said first binary level within any of said like portions;

means for subdividing at least once any portion with a second binary characterizing digit indicative of the presence of said binary digit of said first binary level;

second analyzing means coupled to said subdividing means for detecting the presence of a first binary level in successive subportions of said portion;

second generating means for generating one of two of said binary characterizing digits for each subportion; and means for transmitting said second binary characterizing digits followed by the stored binary signal waveform comprising said subportion or said first binary characterizing digits between the first generated binary characterizing digits representative of the informational content of the preceding and succeeding portions.

5. In a graphic communication system wherein information on a printed document scanned according to a predetermined raster is transmitted by binary electrical signals, a reduced redundancy encoder comprising:

a first shift register with a predetermined number of binary digit storage positions;

a second shift register with a submultiple of said number of binary digit storage positions coupled to the output of said first shift register;

first switching means coupled to the input of said first shift register to monitor the polarity of the binary electrical signals being shifted therethrough;

second switching means at a first binary level coupled to said first switching means to generate a second binary level responsive to the presence of at least one binary digit of said second binary level monitored at said first switching means;

third switching means coupled to the input of said second shift register to monitor the polarity of the binary electrical signals being shifted therethrough;

fourth switching means at a first binary level coupled to said third switching means to generate a second binary level responsive to the presence of at least one binary digit of said second binary level, monitored at said third switching means;

means for transmitting said first or second binary level from said second switching means as first or second binary digits;

means responsive to second binary level at the output of said second switching means for transmitting said first or second binary level from said fourth switching means at a predetermined clock period as first or second binary digits; and means for transmitting the information content of said second shift register means following transmission of said second binary digit from said fourth switching means.

6. A graphic communication system as defined in claim 5, further including:

delta encoding means coupled to receive said scanned information to effectively decrease the occurrence of the signal representative of the printed information on the document presented to said reduced redundancy encoder.

7. In a graphic communication system, a binary encoder for reconstructing a transmitted binary waveform of reduced redundancy comprising:

means for sequentially analyzing said binary waveform for binary digits of a first or second binary level wherein:

said first binary level is indicative of the presence of at least one binary digit of said first binary level in a predetermined portion of said reconstructed waveform, and wherein said second binary level is indicative of the presence of all of said binary digits of said second binary level in a predetermined portion of said reconstructed waveform;

means responsive to said analyzed first binary level for transferring the next predetermined number of binary digits comprising said portion as unanalyzed information;

means responsive to said analyzed second binary level for generating a predetermined number of binary digits of said second level equivalent to the predetermined number of binary digits comprising said portion; and means for sequentially transmitting said unanalyzed binary digits and said generated binary digits.

8. A graphic communication system as defined in claim 7, further including:

delta decoding means coupled to said binary decoder to effectively increase the occurrence of the signal representative of the information data transmitted.